United States Patent [19]

Beaujean et al.

[11] Patent Number: 5,441,661
[45] Date of Patent: Aug. 15, 1995

[54] NON-AQUEOUS LIQUID DETERGENT PREPARATIONS CONTAINING A HYDRATED ZEOLITE A STABILIZED BY A POLAR DEACTIVATING AGENT

[75] Inventors: Hans-Josef Beaujean, Dormagen; Rene-Andres Artiga Gonzalez, Duesseldorf; Jens Bode, Monheim, all of Germany

[73] Assignee: Henkel Kommanditgesellschaft auf Aktien, Duesseldorf, Germany

[21] Appl. No.: 211,187
[22] PCT Filed: Sep. 16, 1992
[86] PCT No.: PCT/EP92/02117
§ 371 Date: Mar. 23, 1994
§ 102(e) Date: Mar. 23, 1994
[87] PCT Pub. No.: WO93/06201
PCT Pub. Date: Apr. 1, 1993

[30] Foreign Application Priority Data

Sep. 25, 1991 [DE] Germany .............. 41 31 906.0

[51] Int. Cl.$^6$ .............. C11D 1/72; C11D 3/12; C11D 3/395; C11D 17/08
[52] U.S. Cl. .............. 252/95; 252/99; 252/102; 252/104; 252/174.12; 252/174.21; 252/174.24; 252/174.25; 252/175; 252/181; 252/DIG. 1; 252/DIG. 14
[58] Field of Search .............. 252/95, 104, 174.12, 252/174.21, 174.25, 164, DIG. 14, 175, 181

[56] References Cited

U.S. PATENT DOCUMENTS

| 3,630,929 | 11/1971 | van Dijk | 252/136 |
|---|---|---|---|
| 3,953,380 | 4/1976 | Sundby | 252/543 |
| 4,743,394 | 5/1988 | Kaufmann | 252/90 |
| 4,769,168 | 9/1988 | Ouhadi | 252/99 |
| 5,011,622 | 4/1991 | Schepers | 252/99 |

FOREIGN PATENT DOCUMENTS

| 0364184 | 4/1990 | European Pat. Off. . |
|---|---|---|
| 0425149 | 5/1991 | European Pat. Off. . |
| 2412837 | 10/1974 | Germany . |
| 2412838 | 1/1975 | Germany . |
| 2510676 | 9/1976 | Germany . |
| 0306975 | 7/1955 | Switzerland . |
| 2217727 | 11/1989 | United Kingdom . |

OTHER PUBLICATIONS

*Organic Solvents—Physical Properties and Methods of Purification*, J. A. Riddick, W. B. Bunger, T. K. Sakano, John Wiley & Sons, 4th Edition 1986, p. 59 (No month available).

*Primary Examiner*—Dennis Albrecht
*Attorney, Agent, or Firm*—Ernest G. Szoke; Wayne C. Jaeschke; Real J. Grandmaison

[57] ABSTRACT

The production of paste-form, bleach-containing and substantially water-free detergents or cleaning preparations was to be improved by the direct use of hydrated zeolite. This was essentially done by impregnating the zeolite with 3 times to 10 times the quantity, based on its weight, of an organic polar deactivating agent which is liquid at room temperature and normal pressure and which has a dielectric constant at 20° C. of at least 2.3 $C^2$. The detergents or cleaning preparations in question are produced by (a) impregnating a quantity of 10 parts by weight to 30 parts by weight synthetic hydrated zeolite NaA with
(b) 3 times to 10 times the quantity of the deactivating agent mentioned,
(c) optionally removing the liquid deactivating agent until the ratio by weight of zeolite to deactivating agent is 1:1 to 1:5 and
(d) incorporating a quantity of 100 parts by weight to 150 parts by weight surfactant,
(e) a quantity of 10 parts by weight to 30 parts by weight bleaching agent,
(f) a quantity of up to 10 parts by weight bleach activator and
(g) optionally other ingredients of detergents or cleaning preparations.

11 Claims, No Drawings

NON-AQUEOUS LIQUID DETERGENT PREPARATIONS CONTAINING A HYDRATED ZEOLITE A STABILIZED BY A POLAR DEACTIVATING AGENT

FIELD OF THE INVENTION

1. Background of the Invention

This invention relates to a process for stabilizing hydrated zeolite, to a stable, liquid or paste-form, substantially water-free detergent or cleaning preparation containing zeolite NaA and bleaching agents and to a process for its production.

2. Discussion of Related Art

Water-free liquid detergents and liquid cleaning preparations containing fine-particle builders are known in large numbers. For reasons of safety in use, detergents and cleaning preparations of the type in question are generally present in the form of stabilized homogeneous suspensions. One particular advantage of water-free detergents is that bleaching agents containing active oxygen can be incorporated relatively easily by comparison with water-based formulations. However, an unacceptable reduction in active bleaching agent during storage has been observed in detergents and cleaning preparations of the type in question, particularly where zeolites are used as builders. As explained for example in European patent application EP 425 149, this is generally attributed to decomposition of the bleaching agent which is produced by the zeolite surface and which increases with increasing water content of the zeolite, but does not normally occur where water-free zeolites are used. Synthetic zeolites, among which zeolite NaA occupies a prominent position as a builder in detergents and cleaning preparations, normally accumulate in the form of more or less completely hydrated powders during their production. Thus, the water content of zeolite NaA can be up to about 25% by weight and is normally of the order of 20% by weight.

European patent application EP 364 184 describes water-free liquid detergents containing deactivated alumosilicated and, optionally, constituents which, normally, readily decompose in the presence of alumosilicates, for example bleaching agents. The alumosilicate is deactivated in a relatively complicated two-stage process comprising treatment with an ammonium compound and subsequent heating, preferably to temperatures of 400° C. to 450° C. The water of hydration present in the alumosilicate is at least partly removed by the heat treatment. At temperatures as high as these, there is a danger, particularly in the case of zeolite A, of at least partial destruction of the zeolite structure and, hence a reduction in the builder quality of the treated material ("overdrying").

According to European patent application EP 425 149, a water-free zeolitic detergent builder is produced by heating in vacuo and substantially complete dehydration of a water-containing zeolite, for example zeolite A. This can be done in the presence of certain polyethers or polyalcohols or substances such as these are subsequently added to the dehydrated zeolite. The builders may be stably incorporated in water-free, bleach-containing liquid detergents, although the production of such detergents is complicated by the relatively difficult drying step.

Accordingly, there was still a need to provide a simple process for the production of stable zeolite- and bleach-containing liquid detergents or cleaning preparations which would enable normal hydrated zeolite to be used.

DESCRIPTION OF THE INVENTION

It has now surprisingly been found that a system of bleaching agent and hydrated zeolite NaA can be very effectively stabilized by treatment of the zeolite with organic liquids which have a certain polarity and which are referred to hereinafter as "deactivating agents". The stabilizing effect of the deactivating agent applies both to the bleaching component of the preparation, which shows significantly lower reductions in active bleaching agent after storage than in non-stabilized preparations, and to the paste-form or liquid detergent or cleaning preparation as a whole which does not show any tendency towards phase separation or separation of solid constituents.

Accordingly, the present invention relates to a process for the production of stabilized synthetic hydrated zeolite NaA which is characterized in that the zeolite is impregnated with 3 times to 10 times the quantity, based on its weight, of an organic polar deactivating agent which is liquid at room temperature and normal pressure and which has a dielectric constant at 20° C. of at least 2.3. The liquid deactivating agent is then preferably removed until the ratio by weight of zeolite to deactivating agent is 1:1 to 1:5. Zeolite pastes which can generally be stirred and poured are thus obtained.

The present invention also relates to a process for the production of a liquid to paste-form, stable, bleach-containing and substantially water-free detergent or cleaning preparation which is characterized in that a quantity of 10 parts by weight to 30 parts by weight synthetic hydrated zeolite NaA is impregnated with 3 times to 10 times the quantity, based on the weight of the zeolite, of an organic polar deactivating agent which is liquid at room temperature and normal pressure and which has a dielectric constant at 20 to 25° C. of at least 2.3, the liquid deactivating agent is optionally removed until the ratio by weight of zeolite to deactivating agent is 1:1 to 1:5 and a quantity of 100; parts by weight to 150 parts by weight anionic and/or nonionic surfactant, a quantity of 10 parts by weight to 30 parts by weight bleaching agent, a quantity of up to 10 parts by weight bleach activator and, optionally, other ingredients of detergents or cleaning preparations are incorporated.

The present invention also relates to a liquid to paste-form, bleach-containing and substantially water-free detergent or cleaning preparation containing zeolite NaA and anionic and/or nonionic surfactant, which contains 5% by weight to 20% by weight hydrated zeolite NaA, 50% by weight to 80% by weight anionic and/or nonionic surfactant, 5% by weight to 20% by weight active-oxygen-containing bleaching agent, up to 6% by weight bleach activator and up to 6% by weight co-builders and/or heavy metal complexing agents, the system of bleaching agent and zeolite being stabilized by impregnation of the zeolite with an organic polar deactivating agent which is liquid at room temperature and normal pressure and which has a dielectric constant at 20° to 25° C. of at least 2.3.

As explained, for example, in Organic Solvents - Physical Properties and Methods of Purification by J. A. Riddick, W. B. Bunger, T. K. Sakano, John Wiley & Sons, 4th Edition 1986, page 59, the dielectric constant is a dimensionless measure of the relative effect which a solvent has on the force with which two oppositely charged plates are attracted. For a vacuum, it is defined as 1.

In the context of the present invention, the expression "substantially water-free" means that the detergents or cleaning preparations according to the invention do not contain any free water which is not bound as water of crystallization or in any other comparable form.

The process according to the invention is preferably carried out by impregnating the zeolite with the liquid deactivating agent for a period of at least 2 minutes and, more particularly, 3 to 5 minutes, which means that the zeolite is totally covered by the liquid for this period. If desired, the mixture of, preferably, 15 parts by weight to 25 parts by weight zeolite and 45 parts by weight to 250 parts by weight deactivating agent may be stirred or ultrasonicated during impregnation to guarantee uniform access of the deactivating agent to the zeolite surface. It is largely immaterial in this regard whether the zeolite is introduced first or is added to the deactivating agent. In a preferred embodiment, the zeolite is stirred into the deactivating agent, particularly where liquids of relatively low density are used. The deactivating agent is then optionally removed until the ratio by weight of zeolite deactivating agent is 5:1 to 1:1 and preferably 4:1 to 1.1:1. This is preferably done by simple filtration, if desired, the filtration process may be accelerated in the usual way by application of a light vacuum on the filtrate side. In this case, it is particularly important to ensure that filtration is terminated at the right time so that no drying takes place and no air is drawn through the deactivated zeolite in order to avoid evaporation of the deactivating agent from the zeolite surface. The zeolite thus deactivated is mixed with the other constituents in a standard mixer, the mixing sequence generally being of minor significance. In a preferred embodiment, the deactivated zeolite is mixed first with the liquid constituents and then with the other solid constituents. More particularly, the surfactant component is introduced first, the deactivated zeolite is added and the bleaching agent, if desired the bleach activator and, optionally, other components are subsequently incorporated. Quantities of 120 parts by weight to 150 parts by weight surfactant, 12 parts by weight to 25 parts by weight bleaching agent and 4 parts by weight to 8 parts by weight bleach activator, up to 15 parts by weight and, more particularly, 1 part by weight to 10 parts by weight co-builders and/or heavy metal complexing agents, up to 15 parts by weight and, more particularly, 3 parts by weight to 10 parts by weight washing alkalis and up to 5 parts by weight and, more particularly, 1 part by weight to 3 parts by weight enzyme, more particularly protease, amylase, lipase or mixtures thereof, are preferably used.

It is important to ensure that all the steps of the process according to the invention are carried out at room temperature or at the temperature to which the liquid or paste-form detergent or cleaning preparation is heated under the mechanical effect involved in the mixing process and which is preferably kept below 40° C., optionally by cooling of the mixer used, so that the ingredients of the detergent or cleaning preparation according to the invention, more particularly the zeolite and bleaching agent, are not damaged.

The hydrated zeolites used in accordance with the invention are typical microcrystalline alumosilicate powders having the approximate total molecular formula $Na_{12}[(AlO_2)_{12}(SiO_2)_{12}] \cdot 27\ H_2O$, which can be obtained by the processes described in German patents DE 24 12 837 and DE 24 12 838. The sodium content may differ by generally no more than 10% from the value indicated in the ideal formula. Larger variations may occur in the water of crystallization content of the zeolite, so that the water content of the hydrated zeolites used in the process according to the invention may amount to between about 17% by weight and about 25% by weight. Accordingly, the quantities indicated for the zeolite NaA apply to zeolite hydrated in this way. The calcium binding power of the zeolites, which may be determined in accordance with DE 24 12 837, is preferably in the range from 100 to 200 mg CaO/g. The zeolites generally have average particle sizes below 10 $\mu$m and, more particularly, in the range from 3 $\mu$m to 5 $\mu$m, which may be determined by known methods, for example using a so-called Coulter Counter.

Suitable deactivating agents having a dielectric constant at 20° to 25° C. of at least 2.3 and preferably in the range from 3 to 35 are, primarily, aliphatic or aromatic hydrocarbons, polydiols, esters of carboxylic acids containing 1 to 3 C atoms and alcohols containing 1 to 4 C atoms, carboxylic acids containing 1 to 3 C atoms or mixtures thereof. Preferred hydrocarbon-containing deactivating agents are those which contain a liquid aromatic hydrocarbon in the form of an alkylbenzene containing a total of 1 to 3 C atoms in the alkyl radical or in the alkyl radicals, of which toluene and the xylenes are mentioned as examples. Among the polydiol-containing deactivating agents, those containing a dimer or oligomer of propylene or ethylene glycol liquid at room temperature, more particularly a liquid polyethylene glycol having a molecular weight in the range from 180 to 650 and preferably in the range from 350 to 450, are preferred. Preferred ester-containing deactivating agents are those which contain a liquid ester of carbonic acid, formic acid or acetic acid and a linear primary alcohol containing 2 to 4 carbon atoms, including for example ethyl acetate and propylene carbonate. The deactivating agent preferably also contains up to 2% by weight and, more particularly, from 0.1% by weight to 1% by weight, based on the deactivating agent as a whole, of at least one carboxylic acid containing 1 to 3 C atoms, for example formic acid, acetic acid, propionic acid or oxalic acid, of which acetic acid is particularly preferred.

The deactivating agent may be insoluble in water, but is preferably soluble in water. In the context of the invention, water-soluble deactivating agents are understood to be those which form at least 10% by weight aqueous solutions at room temperature. Water-soluble deactivating agents preferably have a pH value in the range from 3 to 7 in the concentration mentioned. Through the alkalinity of the zeolite to be deactivated, the mixtures of deactivating agent and zeolite have a pH value (10% by weight in water) of generally above 8.

The nonionic surfactants suitable for use in accordance with the invention are preferably addition products of 3 to 20 mol equivalents ethylene oxide with long-chain primary or secondary alcohols containing 8 to 20 C atoms and preferably 10 to 18 C atoms. Addition products of 4 to 10 mol ethylene oxide with 1 mol saturated or unsaturated fatty alcohol containing 12 to 18 C atoms or oxoalcohol of the same chain length are particularly suitable. Examples of such surfactants are $C_{12/14}$ coconut oil alcohol+3 EO (ethylene oxide), $C_{12/18}$ coconut oil alcohol+5 EO and oleyl/cetyl alcohol+10 EO and also $C_{11/13}$ oxoalcohol+7 EO. Other nonionic surfactants are, primarily, the addition products of ethylene oxide with propylene oxide or with fatty acids, fatty acid amides or alkylphenols containing 12 to 18 C atoms and also the alkyl glycosides, for example the alkyl glucosides or alkyl polyglucosides obtainable from glucose and long-chain primary alcohols. The alkyl glycosides preferably contain 10 to 14 C atoms in the alcohol component and 1 to 3 glycose units per molecule. Nonionic surfactants of the amine oxide type, for example N-coconut oil alkyl-N,N-dimethyl amine oxide and N-tallow alkyl-N,N-dihydroxyethyl amine oxide, and of the fatty acid alkanolamide type are also suitable. Nonionic surfactants such as these are preferably present in the detergents or cleaning preparations according to the invention in quantities of 30% by weight to 75% by weight and, more preferably, in quantities of 40% by weight to 60% by weight.

Suitable synthetic anionic surfactants are, in particular, those of the sulfonate and sulfate type. Surfactants of the sulfonate type which may be used in accordance with the invention are alkylbenzene sulfonates containing a $C_{9-15}$ alkyl group, olefin sulfonates, i.e. mixtures of alkene and hydroxyalkane sulfonates and disulfonates of the type obtained, for example, from $C_{12-18}$ monoolefins containing a terminal or internal double bond by sulfonation with gaseous sulfur trioxide and subsequent alkaline or acidic hydrolysis of the sulfonation products. Other suitable surfactants of the sulfonate type are the alkane sulfonates obtainable from $C_{12-18}$ alkanes by sulfochlorination or sulfoxidation and subsequent hydrolysis or neutralization or by addition of bisulfites onto olefins and also the esters of α-sulfofatty acids, for example the α-sulfonated methyl or ethyl ester of hydrogenated coconut oil, palm kernel oil or tallow fatty acids. Suitable surfactants of the sulfate type are the sulfuric acid monoesters of primary alcohols of natural or synthetic origin, i.e. of fatty alcohols such as, for example, coconut oil fatty alcohol, tallow fatty alcohol, oleyl alcohol, lauryl alcohol myristyl alcohol, palmityl alcohol or stearyl alcohol or the $C_{10-20}$ oxoalcohols or secondary alcohols of the same chain length. The sulfuric acid monoesters of aliphatic primary alcohols alkoxylated with 1 to 6 mol equivalents ethylene oxide or ethoxylated secondary alcohols are also suitable, as are sulfated fatty acid alkanolamides and sulfated fatty acid monoglycerides. Suitable anionic surfactants based on natural raw materials are, in particular, the washing-active soaps, i.e. the salts of $C_{12-18}$ fatty acids. The anionic surfactants are preferably present in the detergents or cleaning preparations according to the invention in the form of their sodium salts or in the form of the soluble salts with organic bases, more particularly mono-, di- and triethanolamine. The quantity of anionic surfactants in the detergents or cleaning preparations according to-the invention is preferably no greater than the quantity of nonionic surfactants and, more particularly, is less than half that of the nonionic surfactants. A preferred content of anionic surfactant is between 5 and 20% by weight, based on the detergent or cleaning preparation as a whole.

In addition, the detergents or cleaning preparations according to the invention may contain small quantities of other surfactants, particularly those of the betaine type. The betaine surfactants are predominantly long-chain quaternary ammonium compounds in Which one of the relatively short alkyl substituents contains an anionic group, generally a carboxyl group. One example of a betaine surfactant is N,N-dimethyl-N-coconut oil alkyl aminoacetate. These amphoteric surfactants are preferably present in the detergents or cleaning preparations according to the invention in quantities of no more than 10% by weight and, more particularly, in quantities of 1% by weight to 5% by weight.

The bleaching agents containing active oxygen incorporated as an additional component in the liquid to pasteform detergents or cleaning preparations according to the invention are preferably inorganic peroxides which are present in the detergent or cleaning preparation in undissolved, i.e. suspended form. Perborate tetrahydrate, perborate monohydrate and the adduct of $H_2O_2$ with sodium carbonate, which is also known as percarbonate, are particularly suitable, preferably being used in the form of their sodium salts. The solid inorganic peroxides are preferably used in very fine-particle form in the process according to the invention. Their content in the detergents or cleaning preparations according to the invention is preferably between 5% by weight and 20% by weight and, more preferably, between 6% by weight and 15% by weight.

In order to boost their bleaching effect, the detergent or cleaning preparations according to the invention may contain bleach activators in addition to inorganic peroxide. The bleach activators are acylating agents which react with hydrogen peroxide in the wash liquor to form peroxycarboxylic acids or salts thereof. Examples of typical bleach activators are tetraacetyl ethylenediamine, pentaacetyl glucose and diacetyl dioxohexahydrotriazine. Besides N-acyl compounds and 0-acyl compounds, anhydrides may also be used. It is preferred to use bleach activators which remain largely undissolved in the liquid component of the detergent or cleaning preparation according to the invention and, accordingly, are predominantly present in suspended form. The quantity of bleach activators is preferably no more than 6% by weight and, more particularly, is in the range from 1% by weight to 5% by weight, based on the detergent or cleaning preparation as whole.

Although the detergents or cleaning preparations according to the invention preferably contain zeolite NaA alone as builder, they may also contain other organic and/or inorganic, soluble or insoluble builders, so-called co-builders. The quantity in which these additional builders are present is generally smaller than quantity of zeolite and is preferably up to 6% by weight and, more particularly, in the range from 1% by weight to 5% by weight, based on the detergent or cleaning preparation as a whole.

Suitable co-builders for the detergents or cleaning preparations according to the invention are, in particular, salts showing an alkaline reaction, more particularly alkali metal salts which not only are capable of precipitating or complexing calcium ions, but also produce a synergistic increase in washing power with the surfactants and show soil suspending power. Of the inorganic salts, water-soluble alkali metal metaphosphates or polyphosphates, particularly pentasodium triphosphate, are still of importance. The organic builders include sequestrants of the aminopolycarboxylic acid type, such as for example nitrilotriacetic acid, ethylenediamine tetraacetic acid and higher homologs thereof. Suitable phosphorus-containing organic complexing agents are the water-soluble salts of alkane polyphosphonic acids, amino- and hydroxyalkane polyphosphonic acids and phosphonopolycarboxylic acids, such as for example methanediphosphonic acid, dimethyl aminomethane-1,1-diphosphonic acid, aminotrimethylene phosphonic acid, ethylenediamine tetramethylene phosphonic acid, diethylenetriamine pentamethylene phosphonic acid, 1-hydroxyethane-1,1-diphosphonic acid and 2-phosphonobutane-1,2,4-tricarboxylic acid. These sequestrants may also be present in relatively small quantities as heavy metal complexing agents and, hence, as stabilizers for per compounds. Among the organic builders, the N-free and P-free polycarboxylic acids which form complex salts with calcium-ions are of particular importance. They include low molecular weight compounds, such as for example citric acid, 2,2'-oxydisuccinic acid or carboxymethyloxysuccinic acid, and polymeric polycarboxylic acids having a molecular weight in the range from 350 to about 1,500,000 in the form of their water-soluble salts. Particularly preferred polymeric polycarboxylates have a molecular weight in the range from 500 to 175,000 and, more particularly, in the range from 10,000 to 100,000. They include such compounds as, for example, polyacrylic acid, poly-α-hydroxyacrylic acid and polymaleic acid and also copolymers of the corresponding monomeric carboxylic acids with one another, more particularly copolymers of acrylic acid and maleic acid, or with other ethylenically unsaturated compounds, such as vinyl methyl ether for example. Water-soluble salts of polyglyoxylic acid are also mentioned. Other builders, which are often used for their hydrotropic properties, are the salts of non-capillary-active $C_{2-9}$ sulfonic acids, carboxylic acids and sulfocarboxylic acids, for example the alkali metal salts of alkane, benzene, toluene, xylene or cumenesulfonic acids, sulfobenzoic acid, sulfophthalic acid, sulfoacetic acid, sulfosuccinic acid and the salts of acetic acid or lactic acid.

Inorganic, non-complexing salts suitable as further ingredients are the bicarbonates, carbonates, borates, sulfates or silicates of the alkali metals which are also known as "washing alkalis". These washing alkalis are preferably present in the detergents or cleaning preparations according to the invention in quantities of not more than 10% by weight and, more preferably, in quantities of 1% by weight to 8% by weight.

In addition to the components already mentioned, the detergents or cleaning preparations according to the invention may contain other additives and auxiliaries of the type typically used in liquid and paste-form detergents and cleaning preparations providing these other ingredients do not affect the stability of the detergents or cleaning preparations. The other ingredients in question are, primarily, foam regulators, redeposition inhibitors, optical brighteners, detergency boosters, enzymes, dyes, perfumes, inorganic salts and preservatives. The total content of these auxiliaries and additives in the detergents or cleaning preparations according to the invention is generally no more than 10% by weight and is preferably between 1% by weight and 5% by weight. The individual components may be present in dissolved or suspended formin the detergents or cleaning preparations.

Foam regulators are, for example, the salts of fatty acids containing 20 to 24 C atoms or long-chain N-alkylaminotriazines. essentially containing 8 to 18 C atoms in the alkyl radical or aliphatic $C_{18-40}$ ketones. Paraffin and silicone oil dispersions, which may optionally be blended with microfine silica, are preferably used. Their content —for example in the case of soaps—may be up to 5% by weight of the detergent of cleaning preparation as a whole and, in the case of paraffins and silicone oils, is normally much lower, more particularly between 0.05% by weight and 0.5% by weight.

Redeposition inhibitors are, above all, polymeric vinyl pyrrolidone and cellulose ethers, such as carboxymethyl cellulose, methyl cellulose, hydroxyalkyl celluloses, and mixed ethers, such as methyl hydroxyethyl cellulose, methyl hydroxypropyl cellulose and methyl carboxymethyl cellulose, and also mixtures of various cellulose ethers, more particularly mixtures of carboxymethyl cellulose and methyl cellulose.

Optical brighteners particularly suitable for detergents are alkali metals salts of 4,4-bis-(2''-anilino-4''-morpholino-1,3,5-triazinyl-6''-amino)-stilbene-2,2'-disulfonic acid or compounds of similar structure which contain a diethanolamino group instead of the morpholino group. Other suitable brighteners are brighteners of the substituted diphenyl styryl type, for example alkali metal salts of 4,4'-bis-(2-sulfostyryl)-diphenyl, 4,4'-bis-(4-cholor-3-sulfostyryl)-diphenyl and 4-(4-chlorostyryl-4'-(2-sulfostyryl)-diphenyl.

Detergency boosters are generally polar long-chain compounds which do not have any surface-active properties of their own, but which are capable of enhancing the detergency performance of surfactants present in the detergents or cleaning preparations. Examples of such compounds are coconut oil amine+2 EO and the addition products of glycerol and long-chain α-olefin epoxide.

The enzymes used may be selected in particular from the class of proteases, lipases and amylases or mixtures thereof. Enzymes obtained from bacterial strains or fungi, such as *Bacillus subtilis, Bacillus licheniformis, Bacillus lentus* and *Streptomyces griseus*, are particularly suitable. The enzymes may be adsorbed onto supports or may be encapsulated in shell-forming substances in the usual way to protect them against premature decomposition.

The viscosity of the detergent or cleaning preparation is dependent primarily on the ratio of the solid to the liquid ingredients of the detergent or cleaning preparation and on the viscosity of the liquid phase. These determining factors may in turn be varied within wide limits through the choice of suitable constituents. For example, viscosity can be reduced by addition of organic solvents and increased by addition of thickening constituents, such as soaps for example. Liquid detergents or cleaning preparations according to the invention preferably have viscosities in the range from about 1,000 mPas to about 5,000 mPas and, more particularly, in the range from about 2,000 mPas to about 4,000 mPas, as measured with a Brook-field viscosimeter at 20° C. The viscosity of paste-form detergents or cleaning preparations, which are preferred by virtue of their particularly high physical stability, is far higher and is preferably above 20,000 mPas.

The preparations according to the invention are intended above all for use in laundering. They may be used as sole detergents or as detergent additives, depending on their content of active components. However, they may also be used for cleaning hard surfaces in the home or in the institutional field providing the active components are selected accordingly. Another advantage is that the preparations can also be automatically dispensed by virtue of the stability of the suspensions.

Examples

Example 1

50 g zeolite NaA (Wessalith® P, a product of Degussa), which had a water content of 20% by weight (determined via the ignition loss at 800° C./1 hour), were stirred into 200 g of a mixture of polyethylene glycol (molecular weight approx. 400) and acetic acid (ratio by weight 100:1). After 4 minutes, the treated zeolite was filtered off. 75 g of a liquid-impregnated product were obtained and were then mixed with the other substances listed in Table 1 in the quantities indicated.

TABLE 1

| Average composition [% by weight] | |
|---|---|
| Zeolite | 10 |
| Nonionic surfactant[a] | 51 |
| Anionic surfactant[b] | 12 |
| Na perborate[c] | 10 |
| TAED[d] powder | 3 |
| $Na_2CO_3$ | 7 |
| $Na_2SO_4$ | 1 |
| Polycarboxylate[e] | 2 |
| Phosphonate[f] | 2 |
| Protease[g] | 1.5 |
| Foam inhibitor[h] | 0.5 |

[a] 2:1 mixture of 3x ethoxylated $C_{12/15}$ fatty alcohol and 7x ethoxylated $C_{12/18}$ fatty alcohol
[b] Secondary alkanesulfonate (Hostapur ® SAS, a product of Hoechst
[c] Monohydrate
[d] N,N,N',N'-tetraacetyl ethylenediamine
[e] Sokalan ® CP5, a product of BASF
[f] Aminotrimethylene phosphonic acid
[g] Alcalase ® 2,55, a product of Novo
[h] Silicone oil VP 1132, a product of Wacker The mixture of nonionic surfactants was introduced first, the deactivated zeolite, the anionic surfactant, perborate, TAED, the polycarboxylate, the phosphonate, the protease and the foam inhibitor were then added and anhydrous sodium carbonate and sodium sulfate were subsequently introduced. A paste-form preparation according to the invention (P1) having a viscosity of 22,500 mPas was obtained. Paste-form preparations P2 to P8 according to the invention were obtained under the same conditions using the other deactivating agents listed in Table 2. For comparison, a corresponding preparation C1 was prepared using non-deactivated zeolite NaA.

TABLE 2

| Deactivating agents used | |
|---|---|
| Deactivating agent | For preparation |
| — | C1 |
| Polydiol[a] + acetic acid | P1 |
| Polydiol[a] | P2 |
| Petroleum[b] + acetic acid | P3 |
| Toluene | P4 |
| Toluene + acetic acid | P5 |
| Ethyl acetate | P6 |
| Ethyl acetate + acetic acid | P7 |
| Propylene carbonate | P8 |
| Propylene carbonate + acetic acid | P9 |

[a] Polyethylene glycol, molecular weight approx. 400
[b] Petroleum ether, boiling range 40 to 110° C.

The deactivating agents containing acetic acid listed in Table 2 contained 1% by weight acetic acid, based on the deactivating agent as a whole.

Example 2

The preparations produced in accordance with Example 1 were stored in sealed containers (screw-closure glass containers) at room temperature. The preparations according to the invention showed only a slight reduction in the concentration of active oxygen (as determined by titration of a sample with 0.1 N $KMnO_4$) after 8 weeks whereas the preparation containing the non-deactivated zeolite showed a reduction in its active oxygen content after only 4 weeks.

TABLE 3

| Active oxygen content [% of initial concentration] | | | |
|---|---|---|---|
| | Active oxygen content after | | |
| Preparation | 4 weeks | 6 weeks | 8 weeks |
| P1 | 100 | 100 | 93 |
| P2 | 100 | 100 | 89 |
| P3 | 100 | 100 | 93 |
| C1 | 94 | 86 | 86 |

We claim:

1. A process for producing a stabilized, synthetic, hydrated zeolite NaA, comprising impregnating, at a temperature below 40° C., said zeolite having a water content of from about 17% to about 25% by weight with 3 to 10 times its quantity by weight, of an organic, polar, non-surfactant deactivating agent which is liquid at room temperature and normal pressure and has a dielectric constant at 20° C. of at least 2.3.

2. The process as in claim 1 including removing, at a temperature below 40° C., said deactivating agent from said zeolite until the ratio by weight of zeolite to deactivating agent is 1:1 to 1:5.

3. A process for producing a paste-form, stable, bleach-containing and substantially water-free cleaning composition, comprising;
   a) impregnating at a temperature below 40° C. from 10 to 30 parts by weight of synthetic, hydrated zeolite NaA having water content of from about 17% to about 25% by weight with
   b) 3 to 10 times the quantity by weight of zeolite, of an organic, polar, non-surfactant deactivating agent which is liquid at room temperature and normal pressure and has a dielectric constant at 20° to 25° C. of at least 2.3,
   c) removing said deactivating agent at a temperature below 40° C. until the ratio by weight of zeolite to deactivating agent is 1:1 to 1:5, and
   d) blending the mixture prepared in step (c) with 100 to 150 parts by weight of a nonionic or anionic surfactant, 10 to 30 parts by weight of a bleaching agent, and up to 10 parts by weight of a bleach activator, based on the weight of said composition.

4. The process as in claim 3 comprising (a) impregnating 15 to 25 parts by weight of said zeolite with (b) 45 to 250 parts by weight of said deactivating agent, (c) blending the mixture with 120 to 150 parts by weight of said surfactant, 12 to 25 parts by weight of bleaching agent, 4 to 8 parts by weight of bleach activator, 1 to 5 parts by weight of organic builder, 1 to 5 parts by weight of heavy metal complexing agent, 3 to 10 parts by weight of washing alkali agent, and 1 to 3 parts by weight of enzyme, based on the weight of said composition.

5. The process as in claim 4 wherein said step of impregnating said zeolite with said deactivating agent is conducted for at least 2 minutes.

6. The process as in claim 3 wherein said deactivating agent contains up to 2% by weight of a carboxylic acid containing 1 to 3 carbon atoms, based on the weight of said deactivating agent.

7. The process as in claim 3 wherein said deactivating agent is soluble in water and has a pH of from 3 to 7 as a 10%/wt. aqueous solution.

8. The process as in claim 3 wherein said deactivating agent is selected from the group consisting of an aliphatic or aromatic hydrocarbon, a polydiol, an ester of a carboxylic acid containing 1 to 3 carbon atoms and an alcohol containing 1 to 4 carbon atoms, a carboxylic acid containing 1 to 3 carbon atoms, and a mixture thereof.

9. The process as in claim 8 wherein said polydiol comprises a liquid polyethylene glycol having a molecular weight from 180 too 650.

10. The process as in claim 8 wherein said aromatic hydrocarbon comprises a liquid alkylbenzene containing 1 to 3 carbon atoms in the alkyl radical.

11. The process as in claim 8 wherein said ester comprises a liquid ester of carbonic acid, formic acid or acetic acid and a linear primary alcohol containing 2 to 4 carbon atoms.

* * * * *